(12) United States Patent
Cui et al.

(10) Patent No.: US 11,753,724 B2
(45) Date of Patent: *Sep. 12, 2023

(54) METHODS OF FORMING DESIRED GEOMETRY ON SUPERALLOY PART USING POWDER MIXTURE OF LOW AND HIGH MELT TEMPERATURE SUPERALLOYS

(71) Applicant: General Electric Company, Schenectady, NY (US)

(72) Inventors: Yan Cui, Greer, SC (US); Matthew Joseph Laylock, Easley, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,472

(22) Filed: Aug. 1, 2022

(65) Prior Publication Data

US 2022/0372627 A1 Nov. 24, 2022

Related U.S. Application Data

(62) Division of application No. 17/079,829, filed on Oct. 26, 2020, now Pat. No. 11,453,949.

(51) Int. Cl.
*C23C 24/04* (2006.01)
*C23C 24/10* (2006.01)
(Continued)

(52) U.S. Cl.
CPC .............. *C23C 24/04* (2013.01); *B33Y 10/00* (2014.12); *B33Y 30/00* (2014.12); *B33Y 70/00* (2014.12); *B33Y 80/00* (2014.12); *C23C 24/106* (2013.01)

(58) Field of Classification Search
None
See application file for complete search history.

(56) References Cited

U.S. PATENT DOCUMENTS 6,491,208 B2 12/2002 James et al.
9,548,518 B2 1/2017 Kumar et al.
(Continued)

FOREIGN PATENT DOCUMENTS

EP 1916318 B1 10/2007
JP 2016079922 A 5/2016

OTHER PUBLICATIONS

Notification of Transmittal of International Preliminary Report on Patentability dated Dec. 7, 2022 for PCT/US2021/071966 filed Oct. 21, 2021; pp. 17.

(Continued)

*Primary Examiner* — Michael P. Rodriguez
(74) *Attorney, Agent, or Firm* — James Pemrick; Charlotte Wilson; Hoffman Warnick LLC

(57) ABSTRACT

Methods of forming a desired geometry at a location on a superalloy part are disclosed. The method may include directing particles of a powder mixture including a low melt temperature superalloy powder and a high melt temperature superalloy powder to the location on the superalloy part at a velocity sufficient to cause the superalloy powders to deform and to form a mechanical bond but not a metallurgical bond to the superalloy part. The directing of particles continues until the desired geometry is formed. Heat is applied to the powder mixture on the repair location. The heat causes the low melt temperature superalloy powder to melt, creating the metallurgical bonding at the location. Another method uses the same directing to form a preform for repairing the location on the part. The low melt temperature superalloy powder melts at less than 1287° C., and (Continued)

the high melt temperature superalloy powder melts at greater than 1287° C.

13 Claims, 3 Drawing Sheets

(51) Int. Cl.
  *B33Y 10/00* (2015.01)
  *B33Y 30/00* (2015.01)
  *B33Y 70/00* (2020.01)
  *B33Y 80/00* (2015.01)

(56) References Cited

U.S. PATENT DOCUMENTS

| | | | |
|---|---|---|---|
| 11,453,949 B2 * | 9/2022 | Cui | B22F 10/64 |
| 2006/0163323 A1 * | 7/2006 | Pietruska | C23C 24/04 |
| | | | 228/101 |
| 2014/0096872 A1 | 4/2014 | Yoshioka et al. | |
| 2016/0325369 A1 | 11/2016 | Prociw et al. | |
| 2019/0201995 A1 | 7/2019 | Prociw et al. | |
| 2019/0308266 A1 | 10/2019 | Binek et al. | |
| 2022/0127727 A1 | 4/2022 | Cui et al. | |

OTHER PUBLICATIONS

Xiao, Huang et al.; "Wide Gap Braze Repair of Gas Turbine Blades and Vanes & a Review"; Journal of Engineering for Gas Turbines and Power; vol. 134; No. 1; Jan. 1, 2012; p. 010801-1-010801-17; Copyright 2012 by ASME.

International Search Report and Written Opinion dated Feb. 7, 2022 for Application PCT/US2021/071966 filed Oct. 2021; pp. 14.

Non-Final Office Action from related U.S. Appl. No. 17/079,829 dated Dec. 9, 2021, 8 pages.

Final Office Action from related U.S. Appl. No. 17/079,829 dated May 26, 2022, 7 pages.

Notice of Allowance from related U.S. Appl. No. 17/079,829 dated Jul. 15, 2022, 8 pages.

* cited by examiner

METHODS OF FORMING DESIRED GEOMETRY ON SUPERALLOY PART USING POWDER MIXTURE OF LOW AND HIGH MELT TEMPERATURE SUPERALLOYS

CROSS REFERENCE TO RELATED APPLICATIONS

This application is a Divisional Application of U.S. patent application Ser. No. 17/079,829, filed Oct. 26, 2020, the entire contents of which are fully incorporated herein.

TECHNICAL FIELD

The disclosure relates generally to superalloy parts, and more particularly, to methods of forming a desired geometry on a superalloy part.

BACKGROUND

High performance industrial parts are oftentimes made of superalloys. Where damage or wear occur to these parts that creates voids, such as in turbine blades, it is desirable to repair the parts to a desired geometry matching the originally manufactured part. Currently, brazing is the main approach to repair superalloy parts. In brazing, a molten material is formed in the repair location, and the material is allowed to cool. Brazing poses a number of challenges. Brazing is ideally carried out on a repair location that is horizontal so the flow of molten material can be controlled to not overflow the repair location. However, many repair locations are not position-able in a perfectly horizontal orientation, such as vertical or curved surfaces. As a result, multiple brazing processes that are time consuming and complicated are performed to address these types of repairs. Another challenge is that many superalloy parts are manufactured to very precise dimensions, for example, using computer controlled additive manufacturing techniques. Using brazing techniques to repair a superalloy part does not allow for the same level of precision as the original manufacturing, resulting in parts that do not meet original dimensional specifications for the part.

BRIEF DESCRIPTION

A first aspect of the disclosure provides a method of forming a desired geometry at a location on a superalloy part, the method comprising: directing particles of a powder mixture including a low melt temperature superalloy powder and a high melt temperature superalloy powder to the location on the superalloy part at a velocity sufficient to cause the superalloy powders to deform and to form a mechanical bond but not metallurgical bond to the superalloy part; continuing the directing of particles until the desired geometry is formed; and applying heat to the superalloy part including the powder mixture, the heat causing the low melt temperature superalloy powder to melt, creating a metallurgical bond with the superalloy part, wherein the low melt temperature superalloy powder has a melt temperature less than 1287° Celsius (° C.), and the high melt temperature superalloy powder has a melt temperature greater than 1287° C.

A second aspect of the disclosure provides a method, including: creating a preform by directing particles of a powder mixture including a low melt temperature superalloy powder and a high melt temperature superalloy powder onto a build plate at a velocity sufficient to cause the superalloy powders to deform and to form a mechanical bond but not a metallurgical bond to the build plate; and applying heat to the preform after having the preform: removed from the build plate, shaped into a desired geometry for a location of a superalloy part, and positioned in the location of the superalloy part, wherein the heat applying causes the low melt temperature superalloy powder to melt and form a metallurgical bond with the superalloy part, wherein the low melt temperature superalloy powder has a melt temperature less than 1287° Celsius (° C.), and the high melt temperature superalloy powder has a melt temperature greater than 1287° C.

A third aspect of the disclosure includes a method, including: creating a preform by directing particles of a powder mixture including a low melt temperature superalloy powder and a high melt temperature superalloy powder onto a build plate at a velocity sufficient to cause the superalloy powders to deform and to form a mechanical bond but not a metallurgical bond to the build plate; and removing the preform from the build plate allowing subsequent shaping into a desired geometry for a location on a superalloy part, wherein the low melt temperature superalloy powder has a melt temperature less than 1287° Celsius (° C.), and the high melt temperature superalloy powder has a melt temperature greater than 1287° C.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
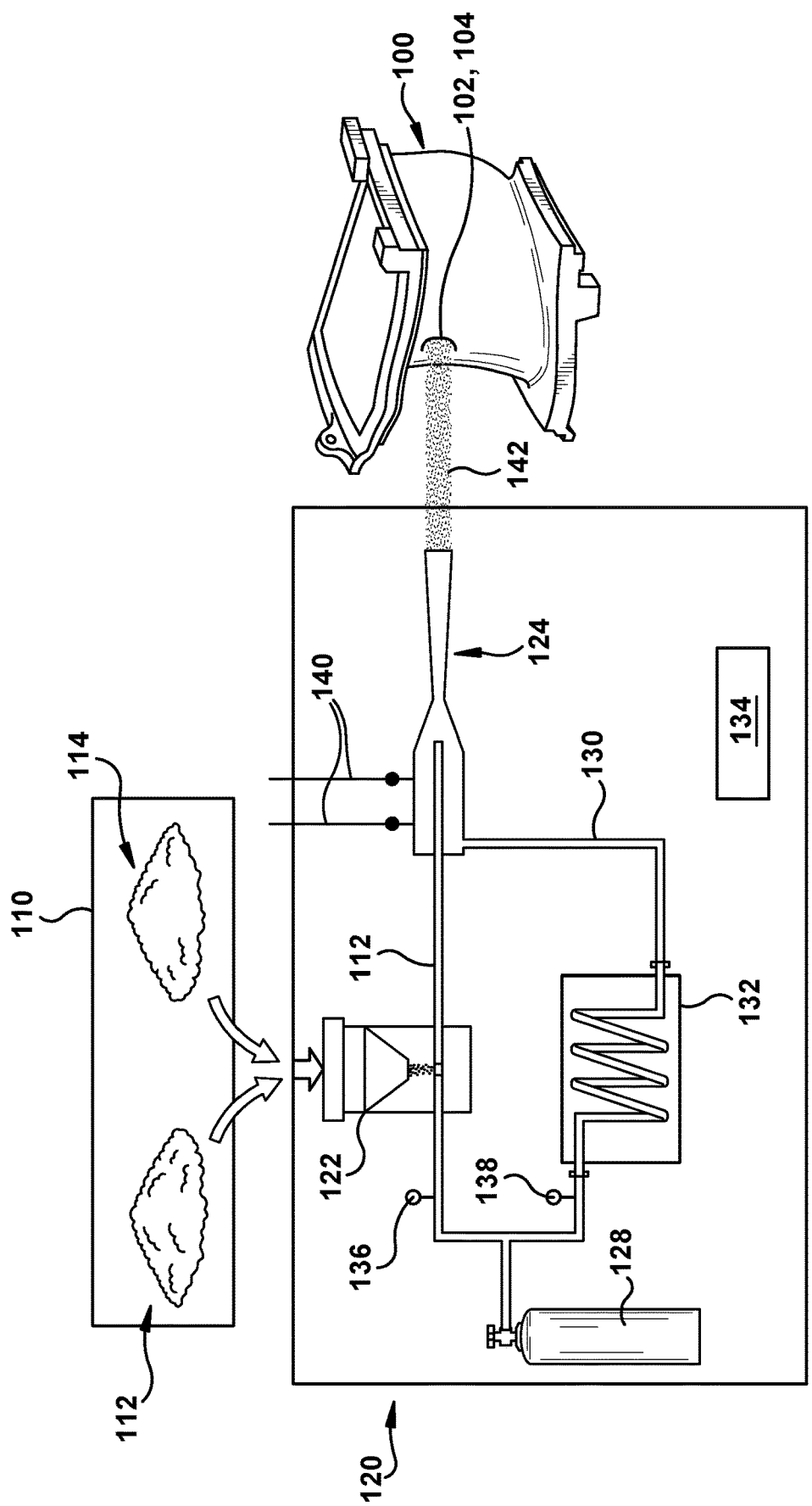
FIG. 1 shows a schematic view of processes in a method of repairing a superalloy part, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides methods of forming a desired geometry at a location on a superalloy part. The methods may include directing particles of a powder mixture including a low melt temperature superalloy powder and a high melt temperature superalloy powder to the location on the superalloy part at a velocity sufficient to cause the superalloy powders to deform and to form a mechanical bond but not metallurgical bond to the superalloy part. The low melt temperature superalloy powder has a melt temperature less than 1287° Celsius (° C.), and the high melt temperature superalloy powder has a melt temperature greater than 1287° C. The particle directing can continue until the desired geometry is formed on the superalloy part. The methods may also include applying heat to the superalloy part and the powder mixture on the repair location. The heat is sufficient to cause the low melt temperature superalloy powder to melt, creating a metallurgical bond at the location. The methods may also include forming a preform on a build plate using the particle directing. The preform may be removed from the build plate, shaped to a desired geometry, and positioned in a location on a superalloy part. Applying heat then melts the low melt temperature superalloy powder (brazes) in place on the superalloy part, forming a metallurgical bond therewith. Any minor machining necessary to bring the repaired superalloy part to match desired dimensional specifications can be carried out thereafter.

FIG. 1 shows a schematic view of a method of repairing a superalloy part 100, according to embodiments of the disclosure. Superalloy part 100 is shown in the form of a turbine nozzle, but could include any form of superalloy part. As used herein, "superalloy" refers to an alloy having numerous excellent physical characteristics compared to conventional alloys, such as but not limited to: high mechanical strength, high thermal creep deformation resistance, like Rene 108, CM247, Haynes alloys, Incalloy, MP98T, TMS alloys, CMSX single crystal alloys. In one embodiment, superalloys for which teachings of the disclosure may be especially advantageous are those superalloys having a high gamma prime (γ') value. "Gamma prime" (γ') is the primary strengthening phase innickel-based alloys. Example high gamma prime superalloys include but are not limited to: Rene 108, N5, GTD 444, MarM 247 and IN 738.

Figure 2:
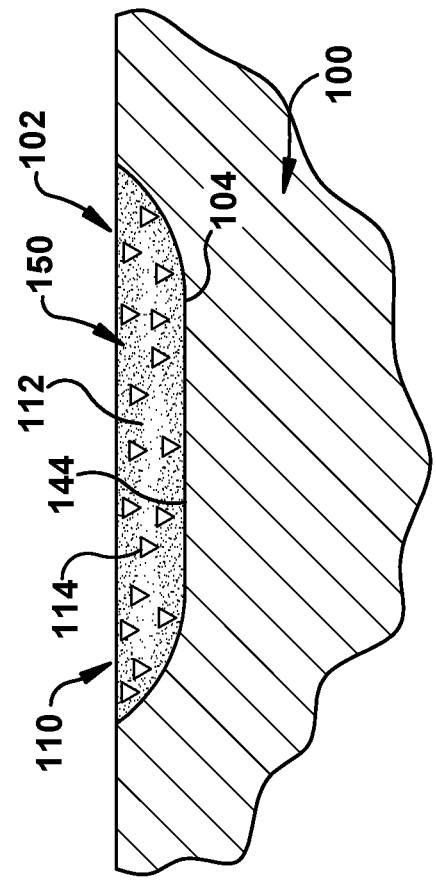
FIG. 2 shows an enlarged cross-sectional view of a location for repair on a superalloy part with a powder mixture therein, according to embodiments of the disclosure.

Superalloy part 100 may include a repair location 102 in which a repair is desired. In one example, superalloy part 100 may have been originally manufactured, for example, using computer controlled additive manufacturing techniques. In another example, superalloy part 100 may have been manufactured by casting. FIG. 2 shows an enlarged cross-sectional view of an illustrative repair location 102 on superalloy part 100. Location 102 that requires repair can take a wide variety of forms, but oftentimes includes an opening 104 or worn area that requires filling with superalloy material. In many applications, repair should bring superalloy part 100 and repair location 102 as close to the desired geometry dictated by the dimensional specification of the original part, as possible. As noted, using brazing techniques to repair a superalloy part does not allow for the same level of precision as the original manufacturing, resulting in parts that do not meet original dimensional specifications for the part.

As shown in FIGS. 1-2, in accordance with embodiments of the disclosure, a powder mixture 110 is directed to location 102 on superalloy part 100 to create the desired geometry. As shown in FIG. 1, powder mixture 110 includes a low melt temperature superalloy powder 112 and a high melt temperature superalloy powder 114. Low melt temperature superalloy powder 112 has a melt temperature less than 1287° Celsius (° C.), and high melt temperature superalloy powder 114 has a melt temperature greater than 1287° C. In one non-limiting example, each powder 112, 114 may have particles in the range of 1 to 200 micrometers in diameter. Low melt temperature superalloy powder may include any form of superalloy braze powder such as but not limited to: AMDRY 770 (BNi-2), AMDRY 100(BNi-5), AMDRY 775(BNi-9), AMDRY DF4B, AMDRY D-15, and AMDRY 915. High melt temperature superalloy powder 114 may include but is not limited to: MarM247, Rene 108, GTD111, GTD444, Inconel 738, Rene 80, Inconel 713, and Inconel 778. Notably, as shown in FIG. 2, when directed to location 102 on superalloy part 100, the superalloy powders 112, 114 deform to form a mechanical bond but not a metallurgical bond to superalloy part 100. In one embodiment, powder mixture 110 may have low melt temperature superalloy powder 112 and high melt temperature superalloy powder 114 in a ratio of 1:1. In other embodiments, however, the ratio may be varied between 15-80% high melt temperature powder 114 and 85-20% low melt temperature powder 112.

As shown in FIG. 1, powder mixture 110 is directed to location 102 using a cold spray system 120. Cold spraying (also known as gas dynamic cold spraying) is a coating deposition method. Cold spray system 120 may include any now known or later developed cold spray device. Generally, cold spray system 120 may include a powder feeder 122 into which powder mixture 110 is deposited in a desired ratio. A nozzle 124 is fluidly coupled to powder feeder 122 via a powder feed line 126, and a gas stream source 128 via gas stream line 130. A gas heater 132 heats a gas stream in gas stream line 128. Cold spray system 120 may include a controller 134 operatively coupled to any necessary valves 136, 138 and/or sensors 140. Controller 134 controls operation of cold spray system 120 in a known fashion. In operation, as shown in FIG. 1, solid powder mixture 110 are accelerated in a supersonic gas jet 142 to velocities up to, for example, about 1200 meters/second. As shown in FIG. 2, during impact with location 102, superalloy powder 112, 114 particles undergo plastic deformation, causing them to adhere to a surface 144 of location 102. Particles are directed to location 102 on superalloy part 100 at a velocity sufficient to cause superalloy powders 112, 114 to deform and to form a mechanical bond, but not a metallurgic bond, to superalloy part 100. Hence, the kinetic energy of powder mixture 110, supplied by gas stream expansion, is converted to plastic deformation energy during bonding. In contrast to other coating techniques such as thermal spraying techniques (e.g., arc spraying, plasma spraying, flame spraying, or high velocity oxygen fuel (HVOF) spraying), powders 112, 114 are not melted as the spraying process occurs. Cold spray system 120 may be controlled in any fashion, e.g., powder feed rate, spray nozzle traverse speed, scanning step, spray angle, etc., to achieve the desired geometry. For example, to achieve a uniform thickness, any of the afore-mentioned cold spray system 120 parameters, can be changed. During the directing of particles, a layer 150 (FIG. 2) can be created on location 102 having a uniform thickness. A non-uniform thickness can also be created, if desired.

The directing of particles of powder mixture 110 can continue, as shown in FIG. 2, until the desired geometry is formed, or nearly formed. The cold spraying may be controlled to create the desired geometry in any manner. In contrast to brazing techniques, embodiments of the disclosure can apply powder mixture 110 very precisely and uniformly, and can apply it in any orientation necessary, e.g., to a slanted or vertical surface, or a surface having a curvature (shown).

Figure 3:
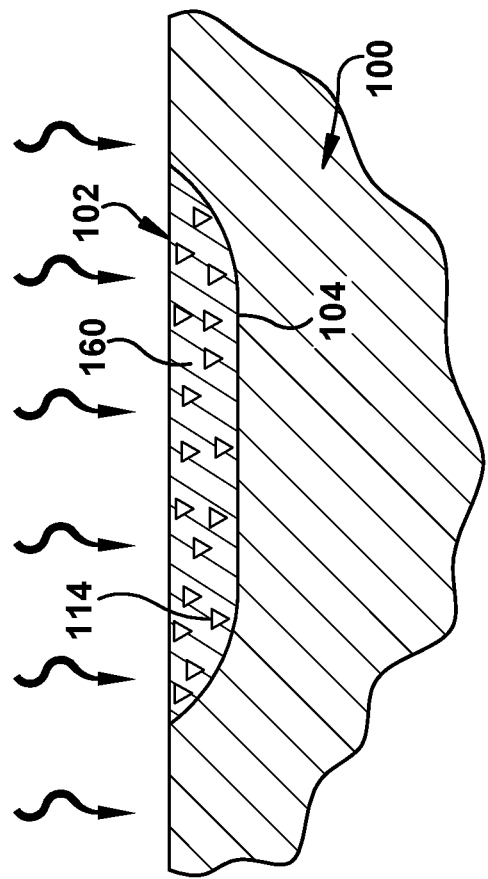
FIG. 3 shows an enlarged cross-sectional view of a location for repair on a superalloy part with a powder mixture therein being heated, according to embodiments of the disclosure.
Figure 4:
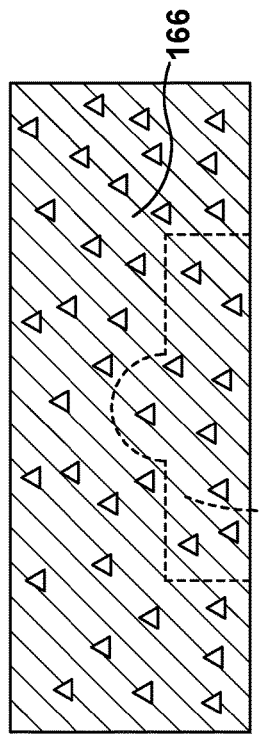
FIG. 4 shows an enlarged cross-sectional view of a build plate for forming a preform with a powder mixture, the preform used in repair of a location on a superalloy part, according to embodiments of the disclosure.

FIG. 3 shows an enlarged cross-sectional view of an illustrative repair location 102 on superalloy part 100, with powder mixture 110 (FIG. 2) applied. FIG. 3 also shows applying heat to superalloy part 100 and powder mixture 110 on repair location 102, i.e., brazing powder mixture 110. As illustrated, the heat causes low melt temperature superalloy powder 112 to melt, creating the metallurgical bond. The heating can be performed, for example, in a vacuum furnace. During the heat applying, high melt temperature superalloy powder 114 remains in solid form, but low melt temperature superalloy powder 112 melts and flows to fill voids between powder 114, creating a solid metallurgical or chemical bond 160 therebetween. The deformed high melt temperature superalloy particles that are bonded on the surface (via mechanical bonding by the cold spray) will not move during the brazing process and will work as a barrier to prevent low melt temperature superalloy liquid overflowing to the undesired locations, thus retaining the desired geometry. Advantageously, the particle directing step can be applied to more than one repair location (e.g., at a variety of arrangements: flat, vertical, overhead, curved, etc.), and the heat application (brazing) can be performed once for all locations. The method may be applied to any shape or size repair to create, e.g., a uniform or non-uniform geometry, a curved surface, etc.

Once hardened, any minor machining of location 102 can be performed, e.g., polishing, etc. As understood in the art, any variety of additional protective coatings, e.g., bond coatings, thermal barrier coatings, etc., can then be applied.

Referring to FIGS. 1, 4-7, another embodiment of a method according to the disclosure in illustrated. In this embodiment, a preform 166 is formed by directing particles of a powder mixture 110 onto a build plate 162 at a velocity sufficient to cause superalloy powders 112, 114 to deform and to form a mechanical bond but not metallurgical bond to build plate 162. As previously described, powder mixture 110 includes low melt temperature superalloy powder 112 and high melt temperature superalloy powder 114. Low melt temperature superalloy powder 112 has a melt temperature less than 1287° C., and high melt temperature superalloy powder 114 has a melt temperature greater than 1287° C. Otherwise, powders 112, 114 may be as described herein. Here, build plate 162 may be any form of hard plate (e.g., metal, hard plastic, etc.) having sufficient strength to receive and hold powders 112, 114. While shown as a flat plate, build plate 162 may have any desired shape, i.e., curved, angled, etc., desired to shape a portion of preform 166 formed thereon. Repair location 102 in this case may be made to at least partially match or already have the shape of the portion of preform 166 shaped by build plate 162. Powder mixture 110 may be directed as described previously herein.

Figure 5:
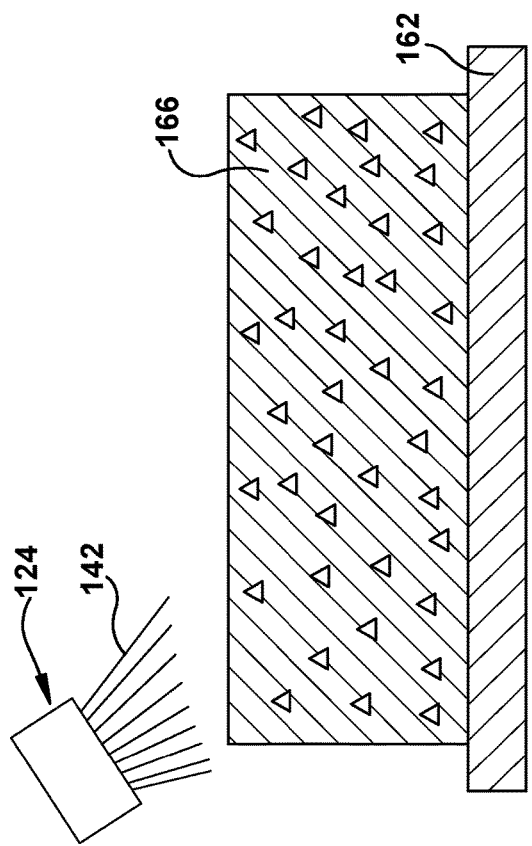
FIG. 5 shows an enlarged cross-sectional view of removing the preform from the build plate in FIG. 4 and shaping the preform, according to embodiments of the disclosure.

FIG. 5 shows removing preform 166 from build plate 162. This removal may be carried out in any manner, e.g., forcing or cutting preform 166 from build plate 162. In some cases, preform 166 may be formed on build plate 162 in a desired geometry (e.g., shape and dimension) in which it can be used to repair superalloy part 100 at a repair location 102 (FIG. 6), providing a ready-to-use preform 172. In other cases, as also shown in FIG. 5, preform 166 may be optionally (in phantom) shaped into a desired geometry for a repair location 102 (FIG. 6) of superalloy part 100, resulting in ready-to-use preform 172. Preform 166 may be shaped in any manner, including but not limited to: machining, water jet, laser cutting, or electric discharge machining (EDM), to attain the desired geometry. Hence the shaping of preform 172 may include removing unwanted material away from the preform. The desired geometry may be any shape and/or dimension to repair a location on part 100. In this manner, this embodiment can be used to repair locations not accessible to cold spraying.

Figure 6:
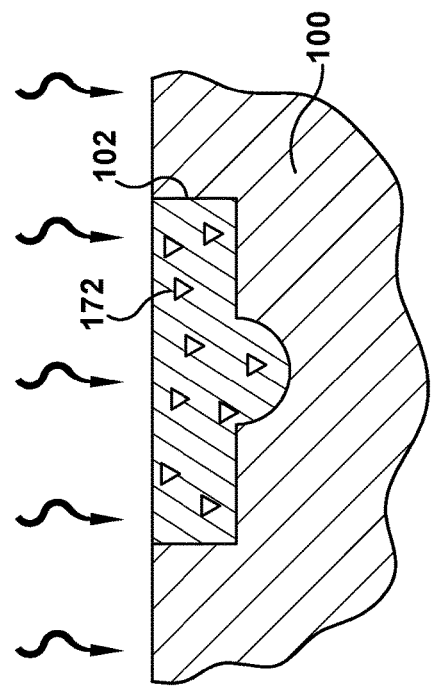
FIG. 6 shows an enlarged cross-sectional view of positioning the preform in for repair location on a superalloy part, according to embodiments of the disclosure.

FIG. 6 shows positioning preform 172 in location 102 of superalloy part 100. Preform 172 can be positioned in the part in any manner, e.g., by hand. Any number of preforms 172 can be positioned in any number of repair locations 102 during this step.

Figure 7:
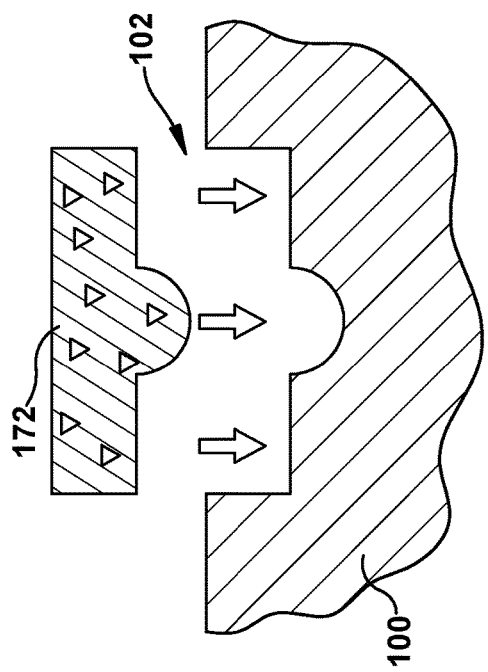
FIG. 7 shows an enlarged cross-sectional view of heating a preform and superalloy part to repair the location, according to embodiments of the disclosure.

Once in position, as shown in FIG. 7, heat may be applied to the part and preform 172 in a known fashion, e.g., a vacuum furnace, to secure preform 172 to superalloy part 100, i.e., in a brazing thermal cycle. The heat applying causes low melt temperature superalloy powder 112 to melt and form a metallurgical bond with superalloy part 100, as described herein. Any number of repair locations 102 with preforms 172 therein can be heated simultaneously. Once hardened, any minor machining of location 102 can be performed, e.g., polishing, etc. As understood in the art, any variety of additional protective coatings, e.g., bond coatings, thermal barrier coatings, etc., can then be applied.

Each of the steps of forming of preform 166, removing preform 166 from build plate 162, shaping preform 166 into preform 172, and positioning preform 172 may be carried out at different locations, and by different actors. Consequently, this embodiment of the method allows for flexibility in repair. For example, the process allows an original equipment manufacturer (OEM) to provide preform 166 (with or without build plate 162) to a service location for superalloy parts 100, and either the OEM or another service provider may remove build plate 162 (where still provided), shape preform 172 as necessary, and carry out the actual repair by positioning preform 172 and applying the heat to preform 172 and superalloy part 100. Preform 172 can be additionally customized, e.g., shaped, or dimensioned, on location where the part is being repaired. Hence, another embodiment of a method according to embodiments of the disclosure may only include the preform 166 creating, and removing preform 166 from build plate 162 allowing subsequent shaping into a desired geometry for location 102 on superalloy part 100. It will also be recognized that an OEM may provide preform 172 already shaped for use.

Embodiments of the disclosure provide methods of repairing superalloy parts, such as precisely dimensioned additively manufactured parts, via a cold spray and brazing process. The powder mixture is composed of low melt and high melt temperature superalloy powders. The powder mixture can be automatically controlled to deposit uniformly on the to-be coated surface by using the cold spray system. Alternatively, the process can be used to create a preform for a repair location. The embodiments described herein provide an effective method to repair hard-to-weld superalloy parts, such as superalloy additively manufactured parts. That said, the methods described herein can also be used to repair cast, forged, and/or welded parts. The repair location has a near net shape after brazing, i.e., it is at or near the desired geometry. In addition, the repair can have a uniform thickness after coat spray buildup and the braze thermal cycle. The methods allow brazing multiple locations (flat or vertical, or overhead) in one braze cycle. The process is easier to implement, and can be controlled to remove human errors. The resulting repair can include dense material, e.g., up to 99%.

The foregoing drawings show some of the processing associated according to several embodiments of this disclosure. In this regard, each drawing may represent a step associated with embodiments of the methods described. It should also be noted that in some alternative implementations, the acts noted in the drawings may occur out of the order noted in the figure or, for example, may in fact be executed substantially concurrently or in the reverse order, depending upon the act involved. Also, one of ordinary skill in the art will recognize that additional steps that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A method of forming a desired geometry at a location on a superalloy part, the method comprising:
    directing particles of a powder mixture including a low melt temperature superalloy powder and a high melt temperature superalloy powder to the location on the superalloy part at a velocity sufficient to cause the superalloy powders to deform and to form a mechanical bond but not metallurgical bond to the superalloy part;
    continuing the directing of particles until the desired geometry is formed, wherein the continuing the directing of particles until the desired geometry is formed includes creating a preform; and
    applying heat to the superalloy part including the powder mixture, the heat causing the low melt temperature superalloy powder to melt, creating a metallurgical bond with the superalloy part,
    wherein the low melt temperature superalloy powder has a melt temperature less than 1287° Celsius (° C.), and the high melt temperature superalloy powder has a melt temperature greater than 1287° C.

2. The method of claim 1, wherein the low melt temperature superalloy powder is a nickel-based superalloy.

3. The method of claim 1, wherein the high melt temperature superalloy powder is a nickel-based superalloy.

4. The method of claim 1, wherein, during the heat applying, the high melt temperature superalloy powder remains in solid form.

5. The method of claim 1, wherein the directing particles creates a layer on the location having a uniform thickness.

6. The method of claim 1, wherein the superalloy part is additively manufactured.

7. The method of claim 1, wherein the superalloy part is cast.

8. The method of claim 1, further including machining the location.

9. The method of claim 8, wherein the machining the location occurs after the heat applying.

10. The method of claim 1, wherein the location includes an opening in the superalloy part.

11. The method of claim 1, further including positioning the preform in the location of the superalloy part.

12. The method of claim 10, wherein the superalloy part is additively manufactured.

13. The method of claim 10, wherein, during the heat applying, the high melt temperature superalloy powder remains in solid form.

* * * * *